June 23, 1936. E. C. HORTON ET AL 2,045,140
TWIN MOTORED WINDSHIELD CLEANER
Filed March 20, 1930
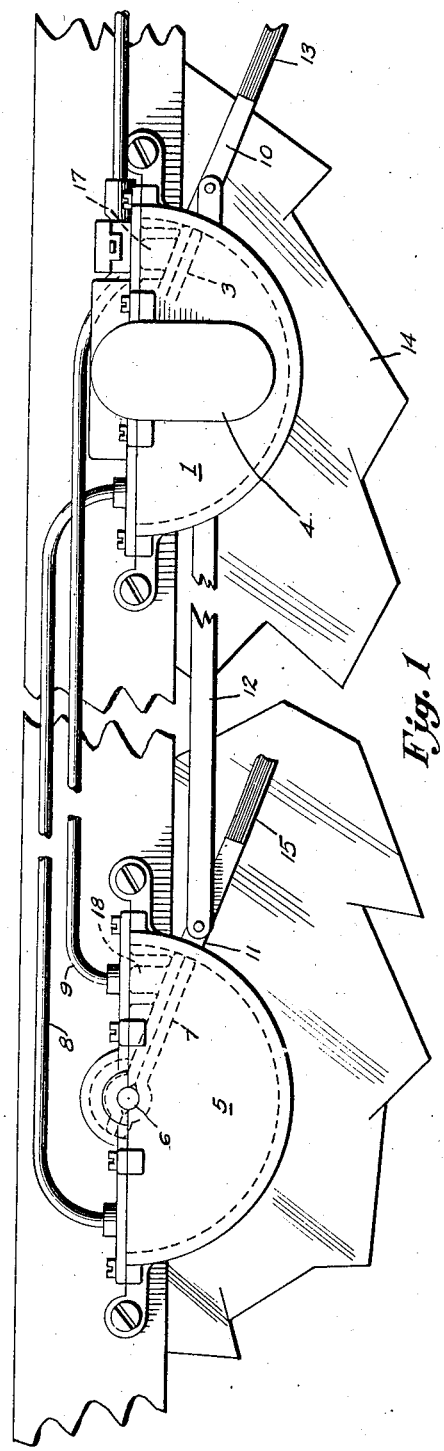
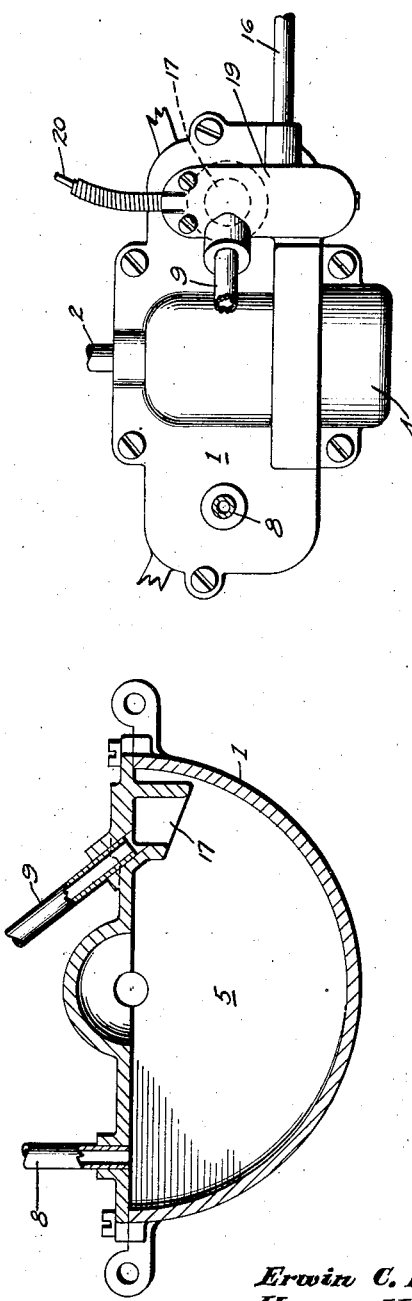
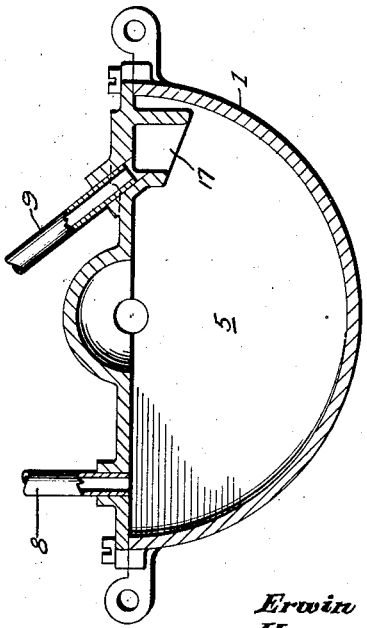
Inventors
Erwin C. Horton
Henry Hueber
By Barton A. Beau Jr.
Attorney Patented June 23, 1936

2,045,140

UNITED STATES PATENT OFFICE 2,045,140

TWIN MOTORED WINDSHIELD CLEANER

Erwin C. Horton, Hamburg, and Henry Hueber, Buffalo, N. Y., assignors to Trico Products Corporation, Buffalo, N. Y.

Application March 20, 1930, Serial No. 437,579

10 Claims. (Cl. 15—255)

This invention relates to a windshield cleaner and more especially to the fluid pressure or so-called suction operated cleaner which is usually connected to the intake manifold of the motor vehicle engine for operation by the negative pressure maintaining therein.

The well known type of windshield cleaner of this character embodies a casing having a piston movable therein under a pressure differential for propelling the windshield wiper back and forth across the windshield glass through a definite path of movement. The prevailing type of cleaner has an arcuate wiper movement so that the area or zone cleared by the wiper is restricted in size and approximately to that field immediately in front of the driver of the car. In order to increase the field of vision and enable the passenger on the front seat to also view the road there has been devised an auxiliary cleaner for pivotal mounting on the windshield in front of the passenger and coupled in tandem relation to the main wiper for being oscillated thereby and in synchronism therewith. This places an additional burden upon the motor which is augmented in the presence of snow or on a resisting surface.

The present invention aims to provide a windshield cleaner of the tandem arrangement in which the power is distributed more evenly to the respective points of wiping contact and in a manner to provide in effect a power unit or drive for each wiper element of the tandem cleaner.

The invention primarily resides in the provision of a twin-motored windshield cleaner in which one motor through its automatic valve mechanism synchronizes the application of fluid pressure to both motors; and to further provide means for insuring a definite synchronized movement of the plural wiper elements.

More particularly the invention involves a pair of motors with the piston chambers connected in parallel communication relative to the opposite sides of the pistons, and a single automatic valve mechanism for controlling the operative application of fluid pressure to the two motors; and, in a modified phase, including means for insuring complete individual wiper movement.

In the drawing:

Fig. 1 illustrates the improved windshield cleaner mounted on a windshield, with portions broken away.

Fig. 2 is a top plan view of the main motor, with portions broken away.

Fig. 3 is a sectional view therethrough.

Referring more particularly to the drawing, the numeral 1 designates the casing or housing of the main motor which is herein depicted as being of the vane piston type and in which is journaled the wiper actuating shaft 2 with the vane or piston 3 fixed thereon. The automatic valve mechanism may be of any desired type such as that illustrated in Patent No. 1,849,327, granted to Henry Hueber on March 15, 1932 and is housed within the valve chamber 4, the office of the valve mechanism being to automatically shift the application of the driving pressure first to one side and then the other side of the piston, as is well known in this art.

The numeral 5 designates the casing of the secondary motor which likewise is provided with a wiper actuating shaft 6 to which is fixed the piston or vane 7. In lieu of having an automatic valve mechanism embodied in the dependent motor the piston chamber at opposite sides of the piston is connected in parallelism with the corresponding chamber portions of the main motor 1, this connection being established by a pair of conduits or passages 8 and 9. Thus, the conduit 8 connects the two piston chambers 1 and 5 at the left hand side of the respective pistons, as viewed in Fig. 1, while the conduit 9 connects the two chambers at the right side of the respective pistons, whereby constant and uninterrupted communication is provided between the two chambers at the corresponding sides of the pistons. Consequently, a negative pressure maintaining in the main chamber at one side thereof is transmitted through and equally distributed by the respective connecting conduit to the corresponding side of the auxiliary motor chamber, and when this particular side of the main chamber is connected to the atmosphere a corresponding pressure variation or change occurs in the auxiliary chamber. Thus the valve mechanism in chamber 4 serves, and is common to, both motors.

A wiper carrying arm 10 is fixed to the shaft 2 while an auxiliary wiper arm 11 is fixed to the motor shaft 6, and these two arms are coupled by a connecting link 12 whereby movement of the one arm 10 will not only oscillate its wiper 13 over the windshield glass 14 but, through the connecting link 12, impart a similar movement to the auxiliary wiper 15.

In operation, the main motor is connected to a suitable source of suction, as by means of a conduit 16 which, by means of the automatic valve mechanism in the chamber 4, is alternately transferred to the opposite sides of the piston 3, and by means of the conduits 8 and 9, likewise to the opposite sides of the piston 7, the unconnected side of the chamber 1 being open to the atmosphere through the automatic valve mechanism with a corresponding atmospheric conditioning in the chamber 5. Such application of the suction to the respective sides of the two pistons will result in the application of power directly to the two wiper arms 10 and 11. In the event that the two wipers do not have the same wiping contact with the glass, or are otherwise unequally resisted in their action, the more resisted wiper may lag behind the companion wiper with a more or less non-synchronized movement therebetween, and to overcome this and insure perfect synchronism the connecting link 12 is provided whereby full and complete oscillation of the two wipers is assured.

For parking the wipers out of the field of vision each motor may be provided with a parking port 17 and 18 through which the conduit 9 has communication with the respective piston chambers. The numeral 19 designates a control valve capable of being operated by a suitable manipulator, such as the flexible cable 20 whereby upon interrupting communication between the source of suction and the automatic valve mechanism, the source of suction will be opened to the parking port 17 and through conduit 9 with the parking port 18 whereupon the two pistons 3 and 7 will be respectively urged to their parked positions indicated in Fig. 1. The control valve may be of a desired type such as that illustrated in our Patent No. 1,938,336, granted December 5, 1933.

What is claimed is:

1. In a windshield cleaner, a main motor comprising a chamber, a piston therein, a shaft operable by the piston, a wiper operable by the shaft, automatic valve mechanism for operatively applying fluid pressure to the chamber at opposite sides of the piston, and combined inlet and outlet ports at opposite sides of the piston; a secondary motor comprising in its entirety a chamber, a piston therein, a shaft operable by the piston, a wiper operable by the shaft, and a combined inlet and outlet port to the chamber at each side of the piston; a conduit connecting one of said ports of the first chamber to a like port of the second chamber, and a second conduit connecting the other combined port to the first chamber to the like port of the second chamber.

2. In a windshield cleaner, a main motor comprising a chamber, a piston therein, a shaft operable by the piston, a wiper operable by the shaft, automatic valve mechanism for operatively applying fluid pressure to the chamber at opposite sides of the piston, and combined inlet and outlet ports at opposite sides of the piston; a secondary motor comprising in its entirety a chamber, a piston therein, a shaft operable by the piston, a wiper operable by the shaft, and a combined inlet and outlet port to the chamber at each side of the piston; the corresponding ports of the two chambers being connected, and a mechanical connection between the two motor shafts.

3. A windshield cleaner comprising two fluid pressure operated motors independently actuated by differential pressures, a separate wiper for each motor operatively connected thereto, an automatic valve mechanism functioning in common to both motors so as to produce substantially simultaneous reversals of fluid pressure differentials in both motors for operating the same in unison to drive said wipers, and a mechanical connection between the two motors to control their independent movements and to hold them in synchronized relationship to each other.

4. In a windshield cleaner, a main motor comprising a chamber, a piston therein, a shaft operable by the piston, a wiper operable by said shaft, automatic valve mechanism for operatively applying fluid pressure to the chamber at opposite sides of the piston, a secondary motor comprising in its entirety a chamber, a piston therein, a shaft operable by the piston, a wiper operable by the second shaft, and a combined inlet and outlet port to the chamber at each side of the piston; and conduits connecting the ports of the secondary motor to the valve mechanism of the main motor for controlling the operation of the wiper by the secondary motor from the main motor.

5. A windshield cleaner comprising a main fluid pressure operated motor, a secondary fluid pressure operated motor, each motor having a piston and a chamber in which the piston operates by a fluid pressure differential, the two motors being connected by passages tending to equalize the pressures in the chambers at the respective sides of the pistons whereby the two motors will operate concurrently, automatic valve mechanism for controlling the operative application of fluid pressure to the main motor and operable thereby, the secondary motor being dependent for its fluid pressure from the chamber of the main motor, and wiper means operable by the two motors.

6. A windshield cleaner comprising a main fluid pressure operated motor, a secondary fluid pressure operated motor, each motor having a chamber and a piston therein and also having a wiper moving part, a pair of wipers, one for each motor, connected to the respective moving part, and a single automatic valve mechanism common to both motors for controlling the operative application of fluid pressure thereto.

7. A windshield cleaner comprising a main fluid pressure operated motor, a secondary fluid pressure operated motor, each motor having a chamber and a piston therein and also having a wiper moving part, a pair of wipers, one for each motor, connected to the respective moving part, a single automatic valve mechanism common to both motors for controlling the operative application of fluid pressure thereto, and mechanical means coupling the moving parts of the two motors to insure synchronous movement of the two wipers.

8. A windshield cleaner comprising a main fluid pressure operated motor having a chamber and a piston therein dividing the chamber into portions, a secondary fluid pressure operated motor having a chamber and a piston therein dividing such second chamber into portions, the secondary motor having its chamber portions at opposite sides of the piston connected by fluid passages to the chamber portions of the main motor, automatic valve mechanism for controlling the operative application of fluid pressure to the main motor and through said fluid passage to the secondary motor, a suction supply passage leading to the valve mechanism, parking means adapted for connecting the supply passage solely to one chamber portion of the main motor and through one of said fluid passages to a chamber portion of the secondary motor for parking the two motors and a pair of wipers operatively connected to the two motors, one wiper for each motor, said parking means being connected to said supply passage and to said one chamber portion of the main motor.

9. A windshield cleaner comprising two fluid pressure operated motors, each consisting of a chamber and a piston therein and embodying a wiper moving part, a wiper for each motor operatively connected to said moving part, automatic valve mechanism common to both motors for controlling the operative application of fluid pressure thereto, each motor having a parking port through which communication is adapted to be had with the source of operating pressure for parking the wipers, a supply passage to the valve mechanism, and a manually controlled valve connected to the supply passage for interrupting communication between the supply passage and the valve mechanism and concurrently establishing communication between the supply passage and the parking ports of the two motors.

10. A windshield cleaner comprising two fluid pressure operated motors, each motor having a wiper operating shaft disposed substantially at a normal to the windshield, wiper means operatively connected to the shafts of the two motors, automatic valve mechanism operable solely by one motor for supplying both motors with operating pressure, and passages connecting the automatic valve mechanism to the motor which operates the valve mechanism and through such motor to the other motor.

ERWIN C. HORTON.
HENRY HUEBER.